(12) United States Patent
Borgyos et al.

(10) Patent No.: US 12,065,240 B2
(45) Date of Patent: Aug. 20, 2024

(54) SYSTEMS AND METHODS FOR AIRSPACE MANAGEMENT

(71) Applicant: GE Aviation Systems LLC, Grand Rapids, MI (US)

(72) Inventors: Szabolcs A. Borgyos, Grand Rapids, MI (US); Adam J. Diffenderfer, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/469,049

(22) Filed: Sep. 8, 2021

(65) Prior Publication Data

US 2023/0073163 A1    Mar. 9, 2023

(51) Int. Cl.
*B64C 39/02* (2023.01)
*G05D 1/00* (2024.01)
(Continued)

(52) U.S. Cl.
CPC ......... *B64C 39/024* (2013.01); *G05D 1/0016* (2013.01); *G05D 1/106* (2019.05);
(Continued)

(58) Field of Classification Search
CPC .... B64C 39/024; G05D 1/0016; G05D 1/106; G05D 1/104; G08G 5/0004; G08G 5/0039;
(Continued)

(56) References Cited

U.S. PATENT DOCUMENTS

| 8,594,917 B2 | 11/2013 | Sawhill et al. |
| 8,653,956 B2 | 2/2014 | Berkobin et al. |

(Continued)

FOREIGN PATENT DOCUMENTS

| EP | 0348927 A1 | 1/1990 | |
| WO | WO-2016154947 A1 * | 10/2016 | ........... G03B 15/006 |

OTHER PUBLICATIONS

Munoz et al., "A Family of Well-Clear Boundary Models for the Integration of UAS in the NAS", 14th AIAA Aviation Technology, Integration, and Operations Conference, pp. 01-16, Atlanta, 2014.

(Continued)

*Primary Examiner* — Anne Marie Antonucci
*Assistant Examiner* — Jewel Ashley Kuntz
(74) *Attorney, Agent, or Firm* — Dinsmore & Shohl LLP

(57) ABSTRACT

Systems and methods for airspace management. One embodiment of an aerial vehicle, includes a first sensor for detecting a lateral field of view of the aerial vehicle and a vehicle computing device. The vehicle computing device may include a memory component and a processor. The memory component may store logic that, when executed by the processor, causes the aerial vehicle to calculate a detection boundary for the aerial vehicle to maintain a well clear requirement, wherein the detection boundary is based on instantaneous trajectory, planned future trajectory, and a capability of the aerial vehicle and utilize the capability of the aerial vehicle and data from the first sensor to maintain the vehicle within detection boundary. In some embodiments the logic may cause the vehicle to provide an instruction to maintain the aerial vehicle within the detection boundary.

20 Claims, 5 Drawing Sheets

(51) Int. Cl.
*G08G 5/00* (2006.01)
*H04L 67/12* (2022.01)

(52) U.S. Cl.
CPC ........... *G08G 5/0004* (2013.01); *H04L 67/12* (2013.01); *B64U 2201/10* (2023.01); *B64U 2201/20* (2023.01)

(58) Field of Classification Search
CPC ...... G08G 5/0078; G08G 5/045; H04L 67/12; B64U 2201/10; B64U 2201/20; G01S 13/933
See application file for complete search history.

(56) References Cited

U.S. PATENT DOCUMENTS

| | | | |
|---|---|---|---|
| 8,941,489 | B2 | 1/2015 | Sheshadri et al. |
| 8,965,679 | B2 | 2/2015 | Euteneuer et al. |
| 9,601,022 | B2 | 3/2017 | Taveira |
| 9,609,478 | B2 | 3/2017 | Frenz et al. |
| 9,754,496 | B2 | 9/2017 | Chan et al. |
| 9,774,995 | B2 | 9/2017 | So et al. |
| 10,134,291 | B2 | 11/2018 | Chan et al. |
| 10,497,270 | B2 | 12/2019 | Taveira |
| 10,586,464 | B2 | 3/2020 | Leblanc |
| 10,757,536 | B2 | 8/2020 | Jurzak et al. |
| 2016/0282861 | A1 | 9/2016 | Golden et al. |
| 2018/0018886 | A1 | 1/2018 | McCullen |
| 2020/0116856 | A1 | 4/2020 | Roberts et al. |
| 2021/0225182 | A1* | 7/2021 | Wyrobek ............. G08G 5/0052 |
| 2021/0295722 | A1* | 9/2021 | Dawson-Townsend ..................... G08G 5/0021 |

OTHER PUBLICATIONS

Santiago et al., "Pilot Evaluation of a UAS Detect-and-Avoid System's Effectiveness in Remaining Well Clear", Eleventh USA/Europe Air Traffic Management Research and Development Seminar, pp. 1-10, 2015.

Theunissen et al., "Well clear recovery for detect and avoid", 2016 IEEE/AIAA 35th Digital Avionics Systems Conference (DASC), pp. 1-10, Sacramento, Sep. 25-29, 2016.

Extended European Search Report for Application No. 22189927.1 dated Feb. 2, 2023 (8 pages).

* cited by examiner

SYSTEMS AND METHODS FOR AIRSPACE MANAGEMENT

TECHNICAL FIELD

Embodiments described herein generally relate to systems and methods for airspace management and, more specifically, to embodiments for providing a dynamic well clear boundary around an aerial vehicle.

BACKGROUND

For a variety of reasons, safe distances should be maintained between manned in-flight aerial vehicles. With the recent proliferation of unmanned aerial vehicles (e.g., drones), into airspace, the complexities of maintaining safe distances between aerial vehicles have increased. Specifically, a boundary must be maintained between aerial vehicles in order to prevent midair collisions with other aerial vehicles or obstacles, and to avoid the detrimental effects of near-collisions. Boundaries are specified implicitly around performance capabilities of manned aircraft, which are different from unmanned vehicles. These are distance static with respect to the motion of the vehicle. Due to size, weight, and cost considerations, it may not be feasible for small-unmanned aerial vehicles to equip with sensors in order to detect the required volume of air in vicinity of the aircraft.

The infrastructure to maintain operational distance between aerial vehicles is an implied agreement between respective operators of aerial vehicles enabled by the national airspace system (NAS). The operators of any two or more aerial vehicles have a right to expect that a certain safe distance, referred to as a well clear boundary, should be maintained between aerial vehicles. In many circumstances, the well clear boundary refers to a static volume with an approximate 2000-foot lateral separation between all operating aerial vehicles, and the maintenance of an approximate 100-foot vertical separation between all operating aerial vehicles.

As such, maintaining the well clear boundary is a collaborative process in which aerial vehicle operators may rely on vision and/or instrumentation to maintain the mutually understood distance. In order to maintain the well clear boundary, NAS provides existing rules, guidelines, and constructs, as well as services, to aid the operators of aerial vehicles. Such rules and services typically include airspace management constructs for visual flight-based maintenance of the well clear boundary, instrument-based flight rules for maintaining the well clear boundary, and ground-based monitoring aspects to maintain the well clear boundary, etc.

For example, some operators adhere to predefined airspace mapping. Some operators often adhere to rules for operations within that airspace, such as rules demarcating airspace by class. Some aerial vehicles adhere to temporary flight restrictions, any notices to airman/aerial vehicles, etc. For example, some operators adhere to particular traffic rules when approaching airspace proximate to an airport from a class G (uncontrolled) airspace.

Further, visual flight requires operation only in daylight so that operator sightlines are maintained. Visual flight may also necessitate an aerial vehicle maintain a distance from clouds or other visual obstructions that would negate that operator's ability to see the distance between and around the operated aerial vehicles and other aerial vehicles.

For instrument-based flight, course mappings that adhere to available airspace, as demarcated by class of aerial vehicles and class of airspace, must be provided to an airspace governing body, and adherence to temporary flight restrictions and notices to aviator and aerial vehicles must also occur. Additionally, modifications to flight rules and/or flight paths for instrument-based flight occur when passing between classes of airspace, such as when approaching an airport. Optical and terrain maps must be utilized. Strategic and tactical separation of aerial vehicles within an airspace also occurs for instrument-based flight, such as using contractual lexicon of flight maps within an airspace and/or using surveillance-based separation, such as may be provided by ground-based air traffic control using radar techniques. Some aerial vehicles employing instrument-based flight must use a sense and avoid system, e.g., a traffic collision avoidance system (TCAS).

Ground-based maintenance of the well clear boundary may be provided for aerial vehicles employing visual-based flight and/or instrument-based flight. Ground-based monitoring of the well clear boundary typically employs radar that provides a visual indication to a radar operator of the well clear boundary around and aerial vehicles, although it will be understood that radar may also be employed in-air, such as by larger aerial vehicles capable of accommodating onboard radar systems.

All of the foregoing methodologies implement a generally understood well clear boundary that is typically cylindrical in shape with a lateral component, such as a lateral radial dimension of 2000 feet around the aerial vehicle. The well clear boundary may also typically have a vertical dimension or vertical component of 250 feet in each direction.

As mentioned above, the advent of unmanned aerial vehicles and the additional complexities for airspace management that have arisen have made the implementation of the well clear boundary far more difficult. It is apparent that visual flight methods for maintaining the well clear boundary cannot be used in all situations for unmanned aerial vehicles, as the operator does not typically have line of sight of the well clear boundary from the ground.

Moreover, maintenance of the well clear boundary is difficult for smaller unmanned aerial vehicles, such as those in the sub-55 pound aerial vehicles class, because the requisite weight of such instrumentation and sensing would make operation, and indeed, flight, of the unmanned aerial vehicles infeasible. Yet further, ground-based methods of implementing a well clear boundary for unmanned aerial vehicles, such as through the use of radar, may prove chaotic to the extent a large number of unmanned aerial vehicles operate within a given airspace. Additionally, the need for additional radar equipment to account for the proliferation of such unmanned aerial vehicles may be inordinately expensive for air traffic control bodies.

Thus, a need exists for systems and methods for airspace management disclosed herein.

SUMMARY

Systems and methods for airspace management. One embodiment of an aerial vehicle, includes a first sensor for detecting a lateral field of view of the aerial vehicle and a vehicle computing device. The vehicle computing device may include a memory component and a processor. The memory component may store logic that, when executed by the processor, causes the aerial vehicle to calculate a detection boundary for the aerial vehicle to maintain a well clear requirement, wherein the detection boundary is based on instantaneous trajectory, planned future trajectory, and a capability of the aerial vehicle and utilize the capability of the aerial vehicle and data from the first sensor to maintain the vehicle within detection boundary. In some embodiments the logic may cause the vehicle to provide an instruction maintain the vehicle within the detection boundary.

In another embodiment, a system for airspace management includes an aerial vehicle that includes a first sensor for detecting a field of view of the aerial vehicle and a vehicle computing device that includes a memory component and a processor, the memory component storing logic that, when executed by the processor, causes the system to calculate a well clear boundary for the aerial vehicle, wherein the well clear boundary is calculated based on the field of view and a capability of the aerial vehicle, determine that an object is expected to enter into the well clear boundary, and provide an instruction to alter a course of the aerial vehicle to prevent the object from entering into the well clear boundary.

In yet another embodiment, a method for airspace management includes calculating, by a computing device, a well clear boundary for an aerial vehicle, where the well clear boundary is calculated based on a lateral field of view and a capability of the aerial vehicle, determining, by the computing device, that an object is expected to enter into the well clear boundary, and in response to determining that the object is expected to enter into the well clear boundary, providing, by the computing device, an instruction to the aerial vehicle to alter a course of the aerial vehicle to prevent the object from entering into the well clear boundary.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
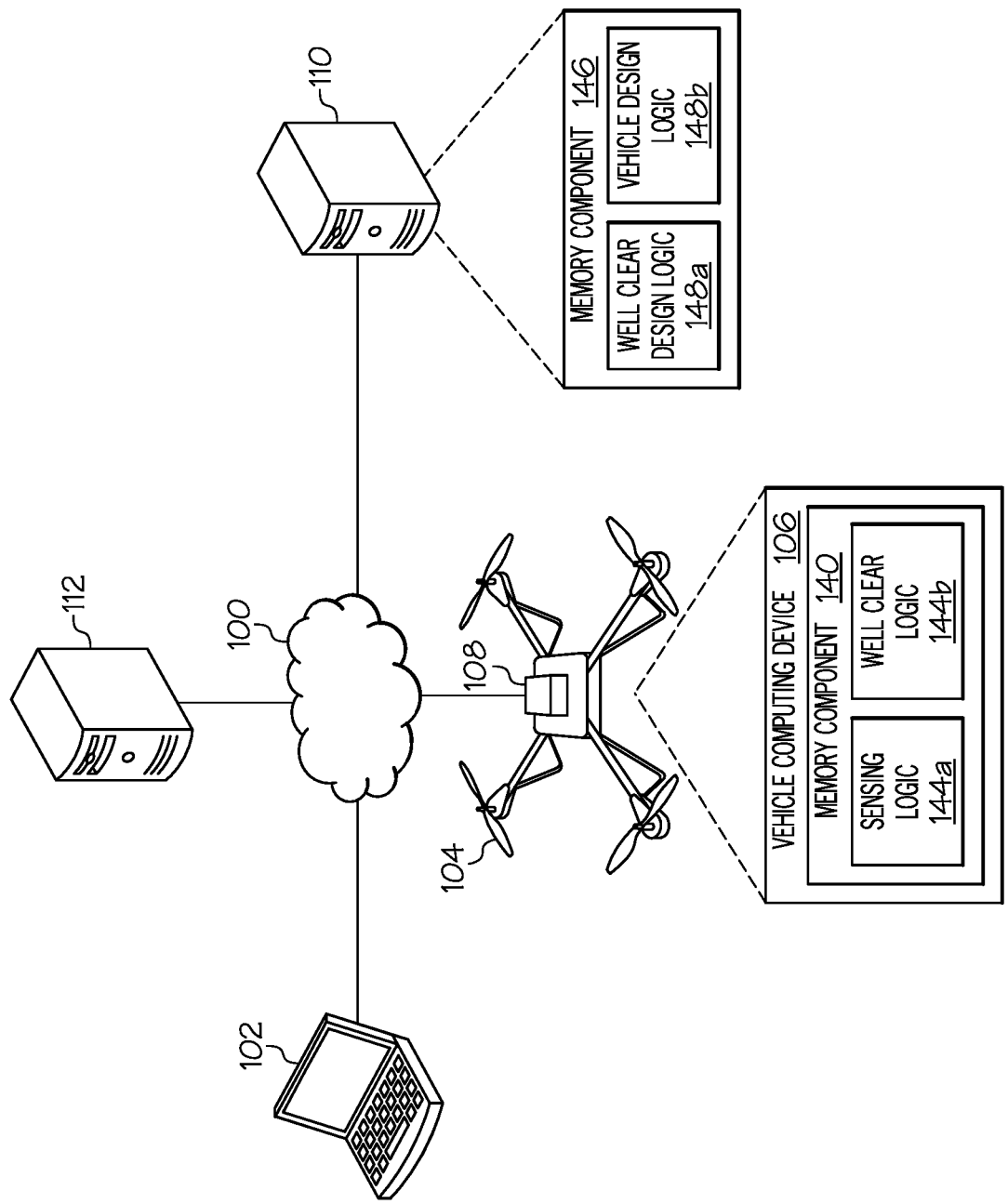
FIG. 1 depicts a computing environment for providing airspace management, according to embodiments provided herein.

Embodiments disclosed herein include systems and methods for providing airspace management. Some embodiments include a well clear boundary having improved efficiency around an unmanned aerial vehicle (UA), such as using on-board sensors and/or off-board sensors that can detect intruder aerial vehicles passing into or that are proximate to the well clear boundary of the aerial vehicle. The maintenance of the well clear boundary can account for impediments to maintenance of the well clear boundary such as delay in round-trip communications with an operator on the ground, operator reaction time, variable aerial vehicles speed, direction and capabilities, etc.

For example, the greater the speed capacity of an aerial vehicle, and/or the larger the delay in aerial vehicle's communications with an operator on the ground, the larger the well clear boundary maintained about that aerial vehicle may become. Conversely, the slower an aerial vehicle is, the greater the sensing capability, and/or the less lag in round trip communications with an operator, the smaller the well clear boundary may become.

Accordingly, embodiments disclosed herein provide a sensing field that may be directly related to the capabilities of the aerial vehicle. In some embodiments, the operation of the aerial vehicle may also be modified based on available sensor output in certain circumstances, such as with or without a directive from or an indication to an operator on the ground.

Consequently, the definition and maintenance of the well clear boundary and/or of the projected field of view necessary to maintain the well clear boundary may be dynamic. Additionally, the well clear boundary may be maintained using hardware (such as onboard sensors), firmware, software, communications between the aerial vehicle and a ground-based operator, etc.

Some embodiments may be configured to reduce and/or minimize the size of the well clear boundary, and/or of the projected field of view to maintain the well clear boundary, in one or more directions for a particular aerial vehicle based on the onboard sensing of that aerial vehicle. Some embodiments may utilize the availability of any automated avoidance maneuvers stored at that aerial vehicle, as well as the airspace agreement for the given aerial vehicle within a particular airspace. Accordingly, the agreement for a given aerial vehicle, which may include identification or profile of the aerial vehicle within an airspace, may include data related to the sensors and capabilities of the particular aerial vehicle, as well as any hardware or software restrictions on those capabilities.

Some embodiments thus provide a commercially scalable system and method for operation of aerial vehicles beyond a line of sight. Embodiments may be configured for operation without the need for ground-based sensing from the aerial vehicle operation and airspace management system. Some embodiments may operate without the use of high-priced or heavy onboard sensors on the aerial vehicle. That is, the onboard sensors may decrease the need to track the maintenance of the well clear boundary from the ground. It will be understood that in some embodiments, the well clear boundary may be partially managed in-air, and may thus be also partially managed using ground-based sensing.

Thus, some embodiments include a memory component that stores logic with one or more flight algorithms. The flight algorithms may be executed by a processor to provide a well clear boundary corresponding to the size or shape of the lateral field of view and/or the vertical field of view. The well clear boundary may be enforced against the capabilities of the aerial vehicle notwithstanding attempted operator intervention. The enforcement of the well clear boundary may freely provide for operator intervention absent violation of the well clear boundary. The well clear boundary may include a three-dimensional bell (or other) shape with respect to a forward motion of the unmanned aerial vehicles. In some embodiments, the well clear boundary may have a lateral range in a range of about 400 feet-1,000 feet, while other embodiments may not be limited as such.

Accordingly, without altering the intent of the current aviation requirements for safe distances, embodiments described herein transpose the requirement from a constant distance (the 'puck') to a constant incursion time. Regardless of the speed and/or performance of the vehicle, this time-based definition is constant. As such, there is a relatively constant puck of time that envelopes the aircraft and the vehicle detects incursion into this 'time-based puck'. Looking at this in distance units, one will notice that the well clear boundary now changes based on speed/performance, instantaneous trajectory, and future predicted trajectory. This may cause the creation of a bell-shaped curve, or other curve around the vehicle. Well clear may be constant as a time to impact measure (the intent of the regulation), but dynamic with respect to a distance measure. Other variables include airspace/assumption of intruder aircraft performance (speed). Given this, embodiments can optimize the on-board sensors such that there is no need to detect the large, distance-based puck, but a smaller, dynamic (if in distance) or constant (if in time) volume that encompasses the aircraft. Further, knowing the equipage and/or sensors on the vehicle and the vehicle capabilities, embodiments can limit the trajectory such that the vehicle does not outrun its ability to monitor the space around the vehicle. The systems and methods for providing airspace management incorporating the same will be described in more detail, below.

Referring now to the drawings, FIG. 1 depicts a computing environment for providing airspace management, according to embodiments provided herein. As illustrated, the computing environment may include a network 100, such as the internet, public switched telephone network, mobile telephone network, mobile data network, local network (wired or wireless), peer-to-peer connection, and/or other network for providing the functionality described herein.

Coupled to the network 100 are a user computing device 102, a vehicle 104 with a vehicle computing device 106 and a sensor 108, a remote computing device 110, and a third party computing device 112. The user computing device 102 may be configured as any device capable of communicating with the vehicle 104, the remote computing device 110, and/or the third party computing device 112. In some embodiments, the user computing device 102 may be portable to provide at least some line of sight control over the vehicle 104. For some embodiments, the user computing device 102 represents one or more devices for controlling the vehicle 104 and communicating with the other devices, as described herein.

The vehicle 104 may be configured as any aerial vehicle, such as an unmanned aerial system (UAS), a small UAS (sUAS), unmanned aerial vehicle (UA), an airplane, helicopter, drone, etc. The vehicle 104 may be configured with the sensor 108 (which represents one or more on-board sensors), such as a temperature sensor, an altitude sensor, an optical sensor, an infrared sensor, a data sensor, an antenna, a transceiver, a radar, a radar altimeter, a depth sensor, a camera, a microphone, an accelerometer, an airspeed sensor, a gyroscopic sensor, light detection and ranging (LIDAR), etc. that can detect altitude, position, pressure, temperature, satellite data, other aerial vehicles, communications from the remote computing device 110 and/or the third party computing device 112, and/or perform other actions. The sensor 108 may also represent one or more off-board sensors, in some embodiments. The sensor 108 may or may not be movable and may be passive or active.

In short, the sensor 108 may affect the operation of the vehicle 104; may provide outputs to an operator so that operation of the vehicle 104 may be modified by the operator; and/or may be a field of view and correspond the field of view to a well clear boundary based on capabilities and current operation of the vehicle 104. As an example, a vehicle 104 capable of high forward speeds, high speed turns, and a small turning radius, but equipped with a sensor 108, such as a field of view sensor that is limited to provide only a 200 foot forward well clear boundary, may be limited to operation at only a maximum of 60% of full available forward speed, 50% of full turning capability, and 30% of full turning radius. However, the same vehicle 104 equipped with an optimized pan and tilt sensing system with a 900 foot lateral, 360 degree field of view sensor, and thus with a large well clear boundary suited to the available field of view, may have no limitations on operation at its maximum capabilities (such as maximum speed and/or maximum turning capability), in part because the field of view provided by the optimized pan and tilt sensing system provides the significant ability to alter the well clear boundary and/or the projected field of view required to maintain the well clear boundary of the vehicle 104.

The vehicle 104 may also include the vehicle computing device 106. The vehicle computing device 106 may include a memory component 140 that stores sensing logic 144a and well clear logic 144b. The sensing logic 144a may be configured to cause the vehicle computing device 106 to receive and interpret data (such as on-board data and/or off-board data) communicated by the sensor 108, as well as control the vehicle 104. The well clear logic 144b may include one or more flight algorithms that includes one or more maneuvers. The one or more maneuvers may correspond to capabilities of the vehicle 104.

The well clear logic 144b may include a well clear boundary algorithm, a field of view morphing algorithm, and/or an operational limiting algorithm. The well clear logic 144b and the related algorithms may be configured to cause the vehicle 104 to modify the field of view and/or the well clear boundary according to the foregoing factors; may be capable of modifying operation of the vehicle 104, such as limiting speed, turning speed, and/or turning radius, for example. In some embodiments, the well clear logic 144b may cause the vehicle 104 to limit operation to less than full capability, either temporarily or permanently. In some embodiments, the well clear logic 144b may cause the vehicle 104 to execute specific maneuvers, such as collision-avoidance maneuvers. While the maneuvers may be stored at the vehicle 104, in some embodiments, template maneuvers or boundary areas based may be stored remotely, such as on the remote computing device 110 and/or the third party computing device 112. Depending on the embodiment, these templates may be modifications to the shape or size of the well clear boundary, a projected field of view, and/or may include avoidance maneuvers based on sensor output, by way of non-limiting example.

More particularly, the well clear logic 144b may be configured to cause the vehicle 104 to generate and/or select a particular curve (e.g., a well clear boundary or projected field of view size and shape), based on data received from the sensor 108. This curve for the well clear boundary may be calculated in real time based on the data from the sensor 108, current operation of the vehicle 104, etc. In some embodiments, the curves may be stored and applied upon certain triggering outputs from the sensor 108. As an example, data from the sensor 108 may indicate a certain current and consequent predicted trajectory, such as based on capabilities of the vehicle 104. This calculation may indicate a current and projected field of view for the sensor 108 to maintain the required well clear boundary in which to identify intruders or prospective intruders.

Also coupled to network 100 is the remote computing device 110. The remote computing device 110 represents one or more different devices for providing at least a portion of the functionality described herein and as such, may be configured as one or more servers, personal computers, databases, and/or other computing devices. The remote computing device 110 may be operated by a vehicle operator, by a vehicle manufacturer, and/or other entity that determines capabilities of the vehicle 104, manages the well clear boundary, and/or performs other related tasks. The remote computing device 110 may include a memory component 146, which may store well clear design logic 148*a* and vehicle design logic 148*b*. The well clear design logic may be similar or the same as the well clear logic and may be configured to manage well clear boundary for the vehicle 104. The vehicle design logic 148*b* may cause the remote computing device 110 to design a vehicle 104 (or modify a design) based on predetermined characteristics of a desired well clear boundary.

Also coupled to the network 100 is the third party computing device 112. The third party computing device 112 may represent one or more computing devices that is operated by one or more third parties. The third party computing device 112 may be configured as a ground control system, NAS, TCAS, and/or other system with whom one of the other devices of FIG. 1 communicates regarding flight, operation, and/or navigation of the vehicle 104. As will be understood, the third party computing device 112 may include hardware and/or software, similar to that described in reference to the remote computing device 110. In some embodiments, the third party computing device 112 may represent a plurality of different entities and/or computing devices for providing the functionality described herein. While labeled as third party computing device 112, it will be understood that this representation may be operated by any third party (or a plurality of individual third parties) to provide the requested data, as described herein.

Figure 2:
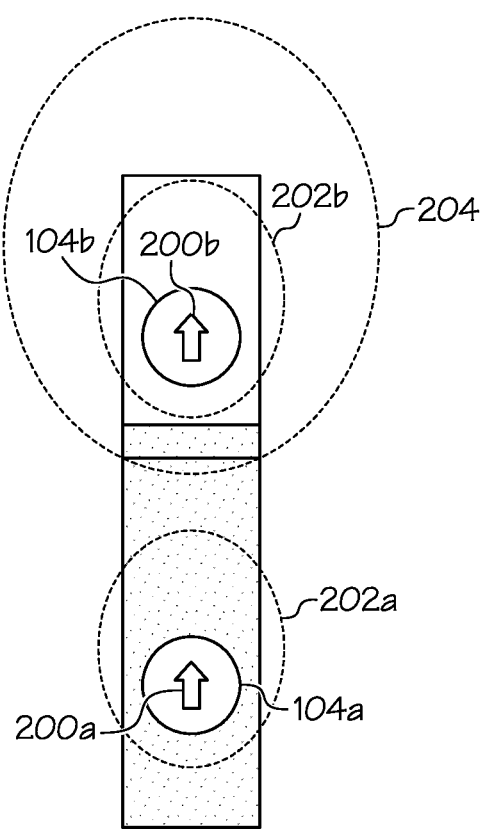
FIG. 2 depicts an aerial vehicle carrying out a field of view and implementing a well clear boundary, according to embodiments provided herein.

FIG. 2 depicts a vehicle 104*a*, 104*b* carrying out operations with a predicted required forward field of view 204 and implementing a well clear boundary 202*a*, 202*b*, according to embodiments provided herein. As illustrated, the vehicle 104*a* represents the vehicle 104 at time t0 and the vehicle 104*b* represents a predicted position of the vehicle 104 at time t0+d, where 'd' represents a number of seconds. The vehicle 104*a* may have a velocity 200*a* and may determine the current well clear boundary 202*a*, based on the maneuvering and sensing capabilities of the vehicle 104, as well as probable maneuvering and/or sensing capabilities of other possible vehicles in the airspace.

Similarly, at time t0+d, the vehicle 104*b* maintains a predicted velocity 200*b*, with the well clear boundary 202*b* and the predicted required forward field of view 204. The predicted required forward field of view 204 is calculated to monitor the well clear boundary 202*b* and is based on the current operation, flight plan, and trajectory of the vehicle at t0, based on the predicted required forward field of view 204. The well clear boundary 202*b* and the predicted required forward field of view 204 are functions of the velocity 200*a* of the vehicle 104*a* at a current point in space and time t0, as well as the predicted velocity 200*b*.

As illustrated, the predicted required forward field of view 204 at t0+d may be larger than the current well clear boundary 202*a*. That is, in order to provide the well clear boundary 202*b*, the predicted required forward field of view 204 must account for the space that may be made up by an intruder (and/or traversed by the vehicle 104) in various directions in 'd' seconds. The well clear boundary 202*a*, 202*b* must be maintained, meaning that any intruder or obstacle that may enter well clear boundary 202*b* must be accounted for in the predicted required forward field of view 204, and is a function of what can be detected by the sensor 108 in light of any maneuvers the vehicle 104 is capable of making in the next 'd' seconds. Thus, a union of a current field of view and the predicted required field of view 204 for all time steps between 't0' and 't0+d' results, for example, in a widened, such as oval, spherical, or bulb shape to the predicted required forward field of view 204 to maintain the well clear boundary 202*a*, 202*b* for the current and predicted trajectory of the vehicle 104.

In some current solutions, the quantity 'd' may be approximately equivalent to or greater than the time, while on the current trajectory, that it takes a pilot or operator to react to a situation, solve the well clear boundary conflict problem, and maneuver in such a way so as to maintain safe separation. However, the embodiments of this disclosure may automate this process, thereby removing the need to account for the reactions by the operator/pilot, and consequently reducing the value of 'd' and correspondingly the predicted required forward field of view 204 to maintain the well clear boundary 202*b*. The value of 'd' may be approximately equal to the lag time between the ability of the vehicle computing device 106 (or other computing device provided herein) to identify a conflict or possible conflict and the ability of the vehicle 104 to maneuver so as to avoid the conflict or possible conflict. As is evident from FIG. 2, due to this functionality, a horizontal dimension of the predicted field of view may be substantially less than the 2,000-foot radius and/or may take a different shape than the traditional hockey puck shape around the vehicle 104.

Figure 3:
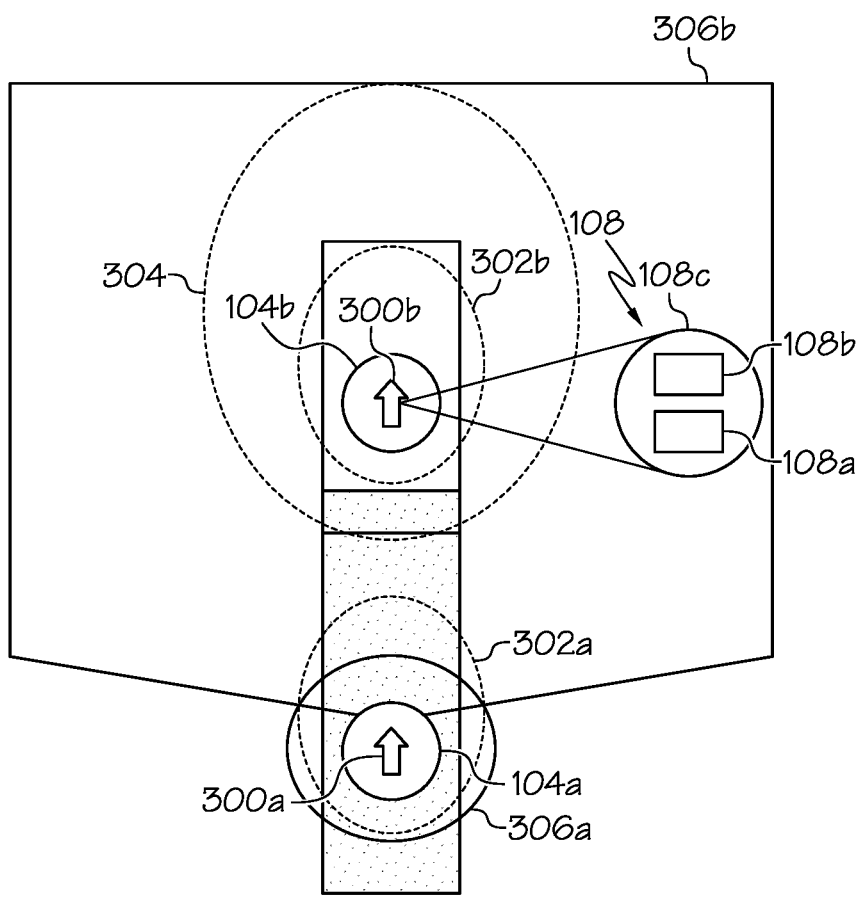
FIG. 3 depicts an aerial vehicle carrying out a field of view and implementing a well clear boundary, according to embodiments provided herein.

FIG. 3 depicts a vehicle 104*a*, 104*b* carrying out an actual field of view 306*b* and implementing a well clear boundary 302*a*, 302*b*, according to embodiments provided herein. As illustrated, the vehicle 104*a* represents the vehicle 104 at time t0 and the vehicle 104*b* represents a predicted position of the vehicle 104 at time t0+d, where 'd' represents a number of seconds. The sensor requirements of the vehicle 104 may be determined to be the amount of sensor coverage needed to have a field of view to provide a well clear area, based on the maximum capabilities of vehicle 104 and/or the algorithmically limited capabilities or the available maneuvers stored onboard of the vehicle 104. As illustrated, the embodiment of FIG. 3 includes a well clear boundary 302*a*, 302*b*. The well clear boundary 302*a*, 302*b* may be covered by the corresponding actual field of view 306*b* (or detection boundary) made available by the sensor 108, which includes a first sensor 108*a*, such as a forward-looking radar-type sensor and a second sensor 108*b*, such as a 360 degree visual sensor and/or multiple cameras controlled by, for example, an Iris Automation program. As illustrated, the actual field of view 306*b* covers both the current well clear boundary 302*a*, the predicted well clear boundary 302*b*, as well as a predicted required forward field of view 304. The required static boundary is depicted as circle 306*a*.

The sensor 108 may provide output that affects constraints on trajectory generation and prediction for the vehicle 104. For example, embodiments may cause the vehicle computing device 106 to limit a maximum turn rate (or maximum turning capacity) of a planned trajectory based on whether the actual field of view 306*b* can cover the predicted required forward field of view 304. Similarly, the sensor 108 may act as a constraint on bank and pitch angle commands of the vehicle 104, such as may have been entered by an operator, such as to maintain constraints provided by the predicted required forward field of view 304. Further, a response lag on operator commands may be implemented by the vehicle computing device 106, such as to ensure that the operator does not maneuver the vehicle 104 into a situation where the sensors 108 cannot maintain the well clear boundary 302a, 302b and the predicted required forward field of view 304

In some embodiments, the well clear boundary 302a, 302b may satisfy the same or similar constraints as are satisfied by the well clear boundary as is currently common. Thus, the actual field of view 306b may define the well clear boundary as the region in which the vehicle 104 can safely maneuver and still anticipate intruders or obstacles in sufficient time to react, given capabilities of the vehicle 104. As such, the vehicle computing device 106 may be configured to ensure that the actual field of view 306b is clear of static constraints, such as terrain, obstacles and airspace constraints; is clear of all cooperative vehicles, both manned and unmanned; and is capable of clearing a conflict with a non-cooperative vehicle, such as without the need for operator or traffic management intervention (including interventions from the ground or other remote locations), and without the need to leave the flight plan region.

Accordingly, the well clear boundary 302a, 302b may be substantially reduced from the 2000 foot lateral separation minimum currently used, such as to the range of 400-1000 feet, by continuously morphing the actual field of view 306b corresponding to the well clear boundary based on the on-board sensor suite and the capabilities of the vehicle 104. More specifically, based on the current flight path (including speed and trajectory), the sensing capabilities and maneuverability of the vehicle 104, as well as the airspace in which the vehicle 104 is flying, the well clear boundary 302a, 302b may be dynamic because the vehicle computing device 106 may be able to sufficiently react to any obstacle that the vehicle 104 could encounter.

As an example, in the case of UAS, a nearby manned operator might have a visual view field of approximately 700-foot lateral range, and thus the sensor 108 and computing resources for the vehicle may provide a well clear boundary of about 800 feet. In such a case, third party manned aerial vehicles will never visually detect this particular aerial vehicle, even at lateral distances within a defined 2000 foot range, because the visual flight of the manned aerial vehicles has a lateral visual of only 700 feet, which is less than the 800 foot well clear boundary maintained by the UAS.

Figure 4:
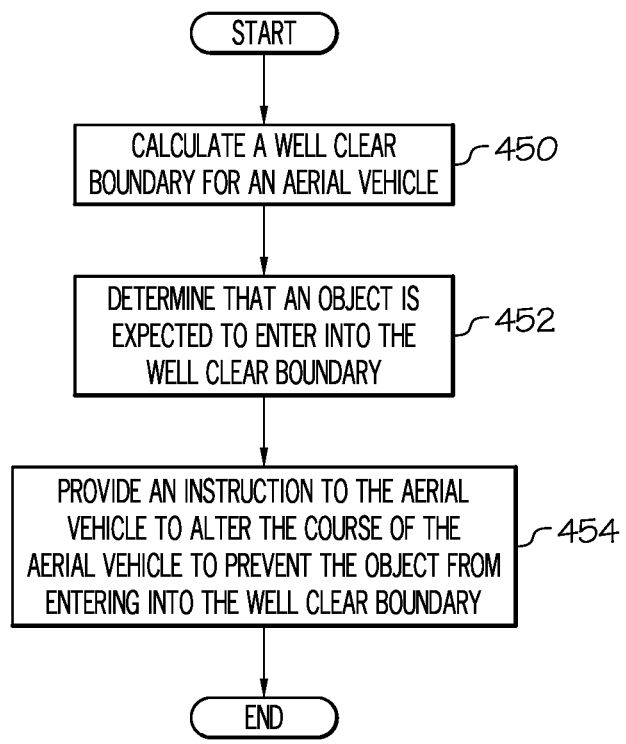
FIG. 4 depicts a flowchart for providing airspace management, according to embodiments provided herein.

FIG. 4 depicts a flowchart for providing airspace management, according to embodiments provided herein. As illustrated in block 450, a well clear boundary may be calculated for an aerial vehicle, where the well clear boundary is calculated based on a lateral field of view and a capability of the aerial vehicle. In block 452, a determination may be made that an object is expected to enter into the well clear boundary. In block 454, in response to determining that the object is expected to enter into the well clear boundary an instruction may be provided to the aerial vehicle to alter the course of the aerial vehicle to prevent the object from entering into the well clear boundary. In some embodiments, an alert and/or message may be provided to an operator of the aerial vehicle, notifying of the possibility that the well clear boundary is or may be breached.

Figure 5:
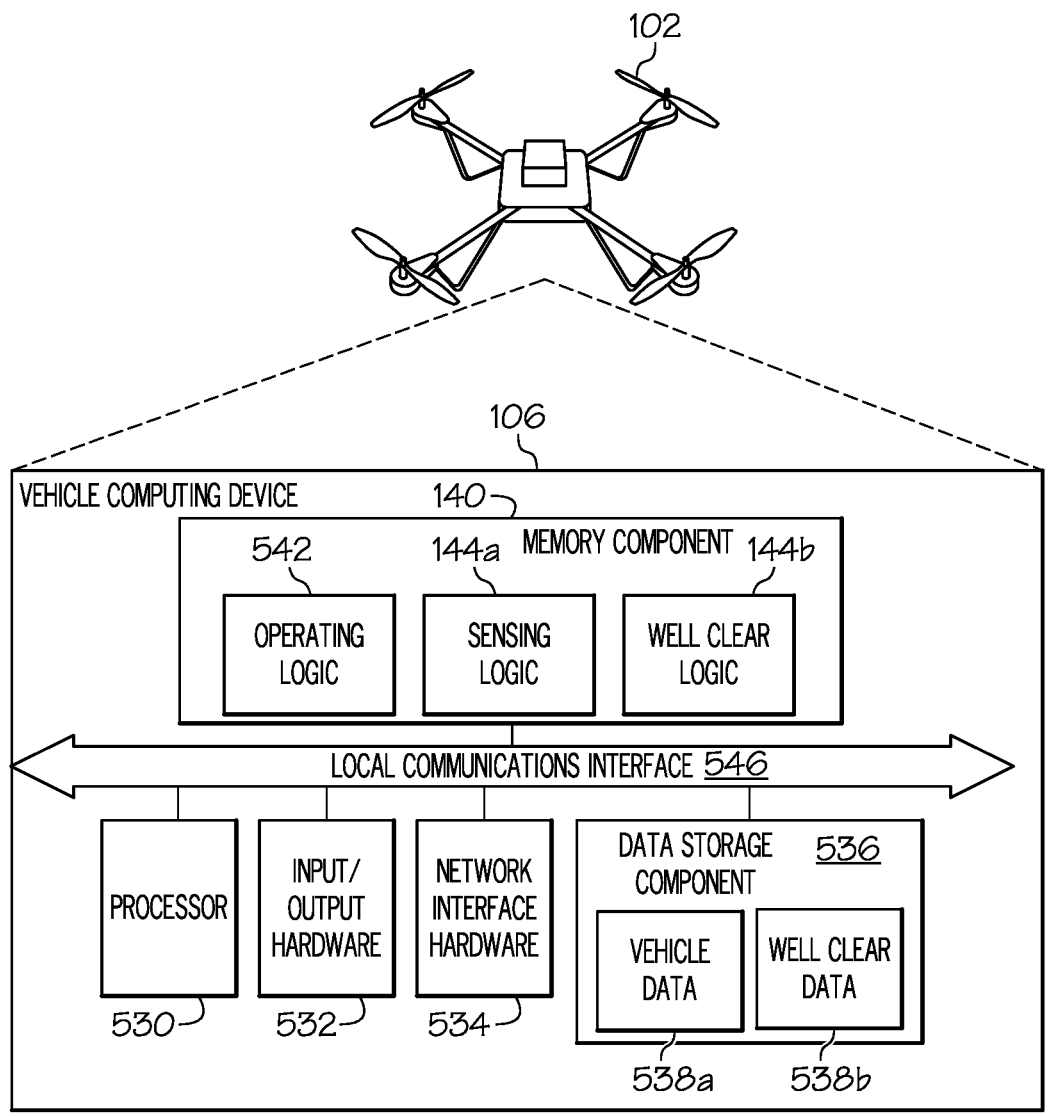
FIG. 5 depicts a computing device for providing airspace management, according to embodiments provided herein.

FIG. 5 depicts a vehicle computing device 106 for providing airspace management, according to embodiments provided herein. As illustrated, the vehicle computing device 106 includes a processor 530, input/output hardware 532, network interface hardware 534, a data storage component 536, which stores vehicle data 538a, well clear data 538b, and/or other data, and the memory component 140. The vehicle data 538a may include information regarding the maneuverability of the vehicle 104, the specifications of the sensor 108 of the vehicle 104, and/or other similar data. The well clear data 538b may include information regarding the desired well clear boundaries in various scenarios.

The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 110 and/or external to the remote computing device 110.

The memory component 140 may store operating system logic 542 and the sensing logic 144a and the well clear logic 144b. As discussed above, the sensing logic 144a and the well clear logic 144b may each include a plurality of different pieces of logic (or combined into a single piece of logic), each of which may be embodied as a computer program or module, firmware, and/or hardware, as an example. A local interface 546 is also included in FIG. 5 and may be implemented as a bus or other communication interface to facilitate communication among the components of the remote computing device 110.

The processor 530 may include any processing component operable to receive and execute instructions (such as from a data storage component 536 and/or the memory component 140). As described above, the input/output hardware 532 may include and/or be configured to interface with the components of FIG. 5.

The network interface hardware 534 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 110 and other computing devices, such as those depicted in FIG. 1.

The operating system logic 542 may include an operating system and/or other software for managing components of the remote computing device 110. As discussed above, the sensing logic 144a may reside in the memory component and may be configured to cause the processor 530 and the vehicle computing device to translate the data received from the sensor 108 into a usable form. The well clear logic 144b may reside in the memory component 140 and may be configured to cause the processor 530 and the vehicle computing device to utilize one or more of the algorithms described above to calculate the actual well clear boundary and perform other functions described herein.

It should be understood that while the components in FIG. 5 are illustrated as residing within the vehicle computing device 106, this is merely an example. In some embodiments, one or more of the components may reside external to the vehicle computing device 106. It should also be understood that, while the vehicle computing device 106 is illustrated as a single device, this is also merely an example. In some embodiments, the sensing logic 144a and/or the well clear logic 144b may reside on different computing devices. As another example, one or more of the functionalities and/or components described herein may be provided by a user computing device 102, the remote computing device 110, the third party computing device 112, and/or other devices, which may be coupled to the vehicle computing device 106 via a network connection (wired or wireless). These devices may also include hardware and/or software for performing the functionality described herein.

Additionally, while the vehicle computing device 106 is illustrated with the sensing logic 144a and the well clear logic 144b as separate logical components, this is also an example. In some embodiments, a single piece of logic (or multiple pieces of logic) may cause the desired computing device to provide the described functionality.

As illustrated above, various embodiments for airspace management are disclosed. The embodiments provided herein include optimization of the well clear boundary to avoid the need to sense an unnecessarily large perimeter of airspace that may be beyond the sensing capabilities of a vehicle. Further, the time that must be allotted in current solutions for collision avoidance due to the latency in the command and control loop (e.g., the time needed for the sensor data from the vehicle to reach the operator, for the operator to react to mitigate a prospective collision, and for the mitigating control signals to reach the vehicles from the operator) is largely or completely eliminated by the embodiments provided herein.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for airspace management. It should also be understood that these embodiments are merely exemplary and are not intended to limit the scope of this disclosure.

Further aspects of the disclosure are provided by the subject matter of the following clauses:

A first aspect includes an aerial vehicle, comprising: a first sensor for detecting a lateral field of view of the aerial vehicle; and a vehicle computing device that includes a memory component and a processor, the memory component storing logic that, when executed by the processor, causes the aerial vehicle to perform at least the following: calculate, a detection boundary for the aerial vehicle to maintain a well clear requirement, wherein the detection boundary is based on instantaneous trajectory, planned future trajectory, and a capability of the aerial vehicle; utilize the capability of the aerial vehicle and data from the first sensor to maintain the vehicle within detection boundary; and provide an instruction maintain the vehicle within the detection boundary.

A second aspect includes the aerial vehicle of the first aspect, wherein the logic further causes the vehicle computing device to perform at least the following: determine that an object is expected to enter into the detection boundary; provide an instruction to alter course of the aerial vehicle to prevent the object from entering into the detection boundary; receive off-board data from an off-board sensor; and utilize the off-board data to determine that the object is expected to enter into the well clear boundary.

A third aspect includes the aerial vehicle of this first and/or second aspect, wherein the logic further causes the aerial vehicle to perform at least the following: receive data from a second sensor on the aerial vehicle that detects a vertical field of view; and determine a vertical component to the detection boundary.

A fourth aspect includes the aerial vehicle of any of the previous aspects, wherein the detection boundary comprises a three-dimensional bell shape.

A fifth aspect includes the aerial vehicle of any of the previous aspects, wherein the detection boundary has a lateral range in a range of about 400 feet to about 1000 feet.

A sixth aspect includes the aerial vehicle of any of the previous aspects, wherein the logic further causes the vehicle computing device to perform at least the following: determine that an object is expected to enter into the detection boundary; and provide an instruction to alter course of the aerial vehicle to prevent the object from entering into the detection boundary, wherein altering the course of the aerial vehicle includes reducing performance of the aerial vehicle to ensure the aerial vehicle remains within the detection boundary, wherein reducing performance includes at least one of the following: reducing a maximum speed or reducing a maximum turning capacity.

A seventh aspect includes the aerial vehicle of any of the previous aspects, wherein the logic further causes the aerial vehicle to communicate an alert to an operator regarding the object.

A eighth aspect includes a system for airspace management comprising: an aerial vehicle that includes a first sensor for detecting a field of view of the aerial vehicle and a vehicle computing device that includes a memory component and a processor, the memory component storing logic that, when executed by the processor, causes the system to perform at least the following: calculate, a well clear boundary for the aerial vehicle, wherein the well clear boundary is calculated based on the field of view and a capability of the aerial vehicle; determine that an object is expected to enter into the well clear boundary; and provide an instruction to alter a course of the aerial vehicle to prevent the object from entering into the well clear boundary.

A ninth aspect includes the system of the eighth aspect, further comprising: a user computing device that is controlled by an operator, wherein the user computing device is configured to provide a command to the aerial vehicle, wherein in response to determining that the object is expected to enter into the well clear boundary, the logic causes the vehicle computing device to send a message to the user computing device regarding the object.

A tenth aspect includes the system of the eighth and/or ninth aspects, further comprising a remote computing device that is coupled to an off-board sensor.

An eleventh aspect includes the system of any of the previous aspects, wherein the logic further causes the system to perform at least the following: receive off-board data from the remote computing device; and utilize the off-board data to determine that the object is expected to enter into the well clear boundary.

A twelfth aspect includes the system of any of the previous aspects, wherein the well clear boundary comprises a three-dimensional bell shape.

A thirteenth aspect includes the system of any of the previous aspects, wherein the well clear boundary has a lateral range in a range of about 400 feet to about 1000 feet.

A fourteenth aspect includes the system of any of the previous aspects, wherein altering the course of the aerial vehicle includes reducing a capability of the aerial vehicle, wherein reducing the capability includes at least one of the following: reducing a maximum speed or a reducing a maximum turning capacity.

A fifteenth aspect includes a method for airspace management comprising: calculating, by a computing device, a well clear boundary for an aerial vehicle, wherein the well clear boundary is calculated based on a lateral field of view and a capability of the aerial vehicle; determining, by the computing device, that an object is expected to enter into the well clear boundary; and in response to determining that the object is expected to enter into the well clear boundary, providing, by the computing device, an instruction to the aerial vehicle to alter a course of the aerial vehicle to prevent the object from entering into the well clear boundary.

A sixteenth aspect includes the method of any of the previous aspects, wherein the well clear boundary comprises a three-dimensional bell shape.

A seventeenth aspect includes the method of any of the previous aspects, wherein the well clear boundary has a lateral range in a range of about 400 feet to about 1000 feet.

An eighteenth aspect includes the method of any of the previous aspects, wherein altering the course of the aerial vehicle includes reducing a capability of the aerial vehicle, wherein reducing the capability includes at least one of the following: reducing a maximum speed or reducing a maximum turning capacity.

A nineteenth aspect includes the method of any of the previous aspects, further comprising communicating an alert to an operator of the aerial vehicle regarding the object.

A twentieth aspect includes the method of any of the previous aspects, wherein the well clear boundary includes at least one of the following: a lateral component and a vertical component.

What is claimed is:

1. An unmanned aerial vehicle, comprising:
    a first sensor for detecting a lateral field of view of the unmanned aerial vehicle; and
    a vehicle computing device that includes a memory component and a processor, the memory component storing logic that, when executed by the processor, causes the unmanned aerial vehicle to perform at least the following:
        calculate a current detection boundary for the unmanned aerial vehicle, wherein the current detection boundary is based on the lateral field of view of the first sensor;
        calculate a well clear boundary based on an instantaneous trajectory, a planned future trajectory, and a capability of the unmanned aerial vehicle;
        predict a predicted required detection boundary for the unmanned aerial vehicle at a predetermined time in the future, wherein the predicted required detection boundary represents the detection boundary that will be needed to maintain the unmanned aerial vehicle in the well clear boundary at the predetermined time in the future; and
        alter the capability of the unmanned aerial vehicle based on the lateral field of view from the first sensor to ensure the current detection boundary covers the predicted required detection boundary.

2. The unmanned aerial vehicle of claim 1, wherein the logic further causes the vehicle computing device to perform at least the following:
    determine that an object is expected to enter into the current detection boundary;
    provide an instruction to alter course of the unmanned aerial vehicle to prevent the object from entering into the current detection boundary;
    receive off-board data from an off-board sensor; and
    utilize the off-board data to determine that the object is expected to enter into the well clear boundary.

3. The unmanned aerial vehicle of claim 1, wherein the logic further causes the unmanned aerial vehicle to perform at least the following:
    receive data from a second sensor on the unmanned aerial vehicle that detects a vertical field of view; and
    determine a vertical component to the current detection boundary.

4. The unmanned aerial vehicle of claim 3, wherein the predicted required detection boundary comprises a three-dimensional bell shape.

5. The unmanned aerial vehicle of claim 1, wherein the current detection boundary has a lateral range in a range of about 400 feet to about 1000 feet.

6. The unmanned aerial vehicle of claim 1, wherein the logic further causes the vehicle computing device to perform at least the following:
    determine that an object is expected to enter into the current detection boundary; and
    provide an instruction to alter course of the unmanned aerial vehicle to prevent the object from entering into the current detection boundary,
    wherein altering the course of the unmanned aerial vehicle includes reducing performance of the unmanned aerial vehicle to ensure the unmanned aerial vehicle remains within the current detection boundary, wherein reducing performance includes at least one of the following: reducing a maximum speed or reducing a maximum turning capacity.

7. The unmanned aerial vehicle of claim 6, wherein the logic further causes the unmanned aerial vehicle to communicate an alert to an operator regarding the object.

8. A system for airspace management comprising:
    an unmanned aerial vehicle that includes a first sensor for detecting a field of view of the unmanned aerial vehicle and a vehicle computing device that includes a memory component and a processor, the memory component storing logic that, when executed by the processor, causes the system to perform at least the following:
        calculate a current detection boundary for the unmanned aerial vehicle to maintain a well clear boundary, wherein the current detection boundary is based on the field of view from the first sensor;
        calculate the well clear boundary for the unmanned aerial vehicle, wherein the well clear boundary is calculated based on the field of view and a capability of the unmanned aerial vehicle;
        predict a predicted required detection boundary for the unmanned aerial vehicle at a predetermined time in the future, wherein the predicted required detection boundary represents a detection boundary that will be needed to maintain the unmanned aerial vehicle in the well clear boundary at the predetermined time in the future;
        alter the capability of the unmanned aerial vehicle based on the field of view from the first sensor to ensure the current detection boundary covers the predicted required detection boundary;
        provide a first instruction to alter the capability of the unmanned aerial vehicle;
        determine that an object is expected to enter into the well clear boundary; and
        provide a second instruction to alter a course of the unmanned aerial vehicle to prevent the object from entering into the well clear boundary.

9. The system of claim 8, further comprising:
a user computing device that is controlled by an operator, wherein the user computing device is configured to provide a command to the unmanned aerial vehicle, wherein in response to determining that the object is expected to enter into the well clear boundary, the logic causes the vehicle computing device to send a message to the user computing device regarding the object.

10. The system of claim 8, further comprising a remote computing device that is coupled to an off-board sensor.

11. The system of claim 10, wherein the logic further causes the system to perform at least the following:
receive off-board data from the remote computing device; and
utilize the off-board data to determine that the object is expected to enter into the well clear boundary.

12. The system of claim 8, wherein the well clear boundary comprises a three-dimensional bell shape.

13. The system of claim 8, wherein the well clear boundary has a lateral range in a range of about 400 feet to about 1000 feet.

14. The system of claim 8, wherein altering the course of the unmanned aerial vehicle includes reducing the capability of the unmanned aerial vehicle, wherein reducing the capability includes at least one of the following: reducing a maximum speed or a reducing a maximum turning capacity.

15. A method for airspace management comprising:
calculating, by a computing device, a current detection boundary for an unmanned aerial vehicle to maintain a well clear boundary, wherein the current detection boundary is based on sensor a lateral field of view of a first sensor;
calculating, by the computing device, the well clear boundary for the unmanned aerial vehicle, wherein the well clear boundary is calculated based on the lateral field of view;
predicting, by the computing device, a predicted required detection boundary for the unmanned aerial vehicle at a predetermined time in the future, wherein the predicted required detection boundary represents a detection boundary that will be needed to maintain the unmanned aerial vehicle in the well clear boundary at the predetermined time in the future;
altering, by the computing device, a capability of the unmanned aerial vehicle based on the field of view from the first sensor to ensure the current detection boundary covers the predicted required detection boundary;
providing, by the computing device, a first instruction to alter the capability of the unmanned aerial vehicle;
determining, by the computing device, that an object is expected to enter into the well clear boundary; and
in response to determining that the object is expected to enter into the well clear boundary, providing, by the computing device, a second instruction to the unmanned aerial vehicle to alter a course of the unmanned aerial vehicle to prevent the object from entering into the well clear boundary.

16. The method of claim 15, wherein the well clear boundary comprises a three-dimensional bell shape.

17. The method of claim 16, wherein the well clear boundary has a lateral range in a range of about 400 feet to about 1000 feet.

18. The method of claim 15, wherein altering the course of the unmanned aerial vehicle includes reducing a capability of the unmanned aerial vehicle, wherein reducing the capability includes at least one of the following: reducing a maximum speed or reducing a maximum turning capacity.

19. The method of claim 15, further comprising communicating an alert to an operator of the unmanned aerial vehicle regarding the object.

20. The method of claim 15, wherein the well clear boundary includes at least one of the following: a lateral component and a vertical component.

* * * * *